United States Patent
Koizumi et al.

(10) Patent No.: US 11,875,668 B2
(45) Date of Patent: Jan. 16, 2024

(54) INFORMATION TRANSMISSION SYSTEM USING BELL

(71) Applicant: Koizumi Factory Corporation, Takaoka (JP)

(72) Inventors: Toshihiro Koizumi, Takaoka (JP); Hironori Ogawa, Tokyo (JP); Keiichi Osaku, Tokyo (JP); Dankan Arekusanda Eriku Shoton, Tokyo (JP); Masaru Mizuochi, Tokyo (JP); Mio Omura, Yokohama (JP)

(73) Assignee: Koizumi Factory Corporation, Takaoka (JP)

( * ) Notice: Subject to any disclaimer, the term of this patent is extended or adjusted under 35 U.S.C. 154(b) by 283 days.

(21) Appl. No.: 17/370,227

(22) Filed: Jul. 8, 2021

(65) Prior Publication Data
US 2021/0335105 A1    Oct. 28, 2021

Related U.S. Application Data

(63) Continuation of application No. PCT/JP2019/000229, filed on Jan. 8, 2019.

(51) Int. Cl.
*G08B 25/08* (2006.01)
*G08B 3/00* (2006.01)
(Continued)

(52) U.S. Cl.
CPC ............... *G08B 3/00* (2013.01); *G10K 1/064* (2013.01); *G10L 25/51* (2013.01)

(58) Field of Classification Search
CPC . G08B 3/00; G08B 3/10; G10K 1/064; G10L 25/51; H04M 1/0291; H04M 1/72412; H04N 7/186
(Continued)

(56) References Cited

U.S. PATENT DOCUMENTS 6,414,589 B1 * 7/2002 Angott ............... G08B 1/08
                                                340/384.7
11,488,077 B1 * 11/2022 Lyman ............ H04L 12/2825
(Continued)

FOREIGN PATENT DOCUMENTS

JP          H 10-227852 A      8/1998
JP          2007-74071 A       3/2007
(Continued)

OTHER PUBLICATIONS

Written Opinion of the International Searching Authority for International Application No. PCT/JP2019/000229, dated Dec. 2, 2019, 7 pages total (including translation).
(Continued)

*Primary Examiner* — Tai T Nguyen
(74) *Attorney, Agent, or Firm* — David L. Hoffman; Nolan Heimann LLP

(57) ABSTRACT

An information transmission system includes a bell, a transmitter, a manual actuator that is manually operated by an operator and actuates the bell, and a controller having a sensor and a memory, wherein the controller analyzes operation information of actuation of the bell actuated by the manual actuator based on an output from the sensor and stores the operation information to the memory, and wherein the transmitter determines operator information corresponding to the operator in the operation information recorded in the memory when the operator rings the bell, and sends the determined operator information.

12 Claims, 5 Drawing Sheets

(51) Int. Cl.
  *G10K 1/064*  (2006.01)
  *G10L 25/51*  (2013.01)
(58) Field of Classification Search
  USPC .......................................................... 340/692
  See application file for complete search history.

(56) References Cited

U.S. PATENT DOCUMENTS

| 2006/0012466 | A1* | 1/2006 | Wagner | .................... | G08B 3/10 |
| | | | | | 340/286.11 |
| 2014/0070922 | A1* | 3/2014 | Davis | .................. | H04M 11/025 |
| | | | | | 340/6.1 |
| 2015/0049191 | A1* | 2/2015 | Scalisi | ................... | H04N 7/188 |
| | | | | | 348/143 |
| 2017/0109983 | A1 | 4/2017 | Flint | | |
| 2018/0197383 | A1* | 7/2018 | Tso | .................... | H03K 17/6871 |
| 2018/0234531 | A1* | 8/2018 | Ekkel | ....................... | G08B 7/06 |

FOREIGN PATENT DOCUMENTS

| JP | 2013-218085 A | 10/2013 |
| KR | 101934086 B1 | 12/2018 |
| WO | WO 2017/069932 A1 | 4/2017 |

OTHER PUBLICATIONS

International Search Report for International Application No. PCT/JP2019/000229, dated Feb. 12, 2019, 3 pages total (including translation).
Extended European Search Report dated Dec. 23, 2021 for European Application No. 19909400.4, 11 pages total.

* cited by examiner

INFORMATION TRANSMISSION SYSTEM USING BELL

CROSS REFERENCE TO RELATED APPLICATION

This application is a continuation of International Patent Application No. PCT/JP2019/000229, having an international filing date of Jan. 8, 2019, which designated the United States, the entirety of which is incorporated herein by reference.

TECHNICAL FIELD

The present disclosure relates to an information transmission system using a bell for an IoT device.

BACKGROUND

A bell in related art has been used for enjoyment by ringing or has been used for simply noticing a person that a bell is rung such as a doorbell or an alarm bell.

JP-A-10-227852 discloses a technique in which a notification is made by a room lamp by a wireless operation between portable equipment and a vehicle such that a subject vehicle can be found, however, the technique does not use information transmission using a bell.

BRIEF DESCRIPTION OF THE DRAWINGS

FIG. 1A illustrates an example where information that a bell is rung is sent, and FIG. 1B illustrates a case where a bell rings by receiving other information.

DESCRIPTION OF EXEMPLARY EMBODIMENTS

Figure 1A:
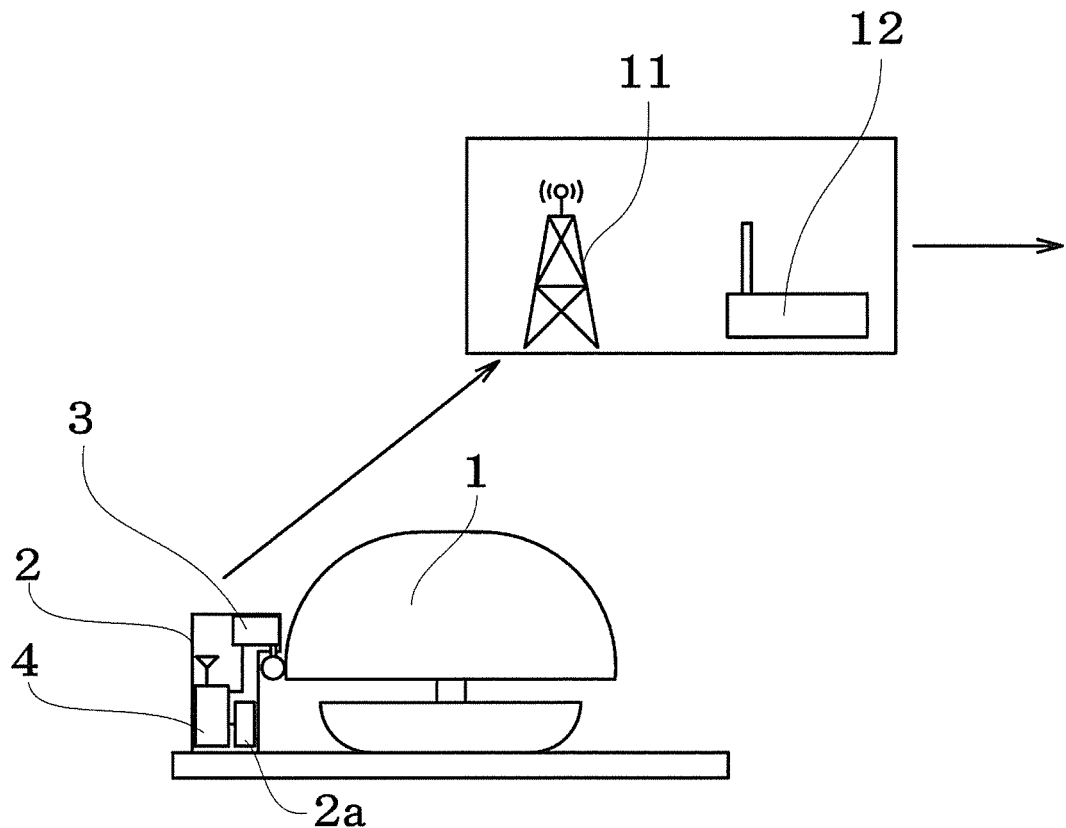
FIG. 1A and FIG. 1B illustrate a configuration example of an information transmission system according to the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

The disclosure intends to provide an information transmission system for an IoT device, that is capable of sending specific information or communicating information mutually by using a bell.

In accordance with one of some embodiments, there is provided an information transmission system using a bell, comprising: a bell, a transmitter, a manual actuator that is manually operated by an operator and actuates the bell, and a controller having a sensor and a memory, wherein the controller analyzes operation information of actuation of the bell actuated by the manual actuator based on an output from the sensor and stores the operation information to the memory, and wherein the transmitter determines operator information corresponding to the operator in the operation information recorded in the memory when the operator rings the bell, and sends the determined operator information.

Here, the operation information of actuation of the bell preferably includes photo information of the operator of the bell, and the operator information sent by the transmitter may be capable of being received by a portable terminal.

Persons who operate the bell such as parents and children have so-called habits in their operations.

Further, when the bell is used as a doorbell or a call bell of a hotel or the like, whether or not a visitor is a person who has already visited there can be assessed based on the operation information analyzed by the controller. In a case of a new visitor, the operation information is analyzed and stored in the memory together with ID information, photo information, or the like.

In the disclosure, the information transmission system preferably includes plural bells, and a transmitter-receiver including the transmitter for each of the plural bells are preferably mutually connected.

The controller may have a detector that detects person information such as a bell of the other party side, to whom information is to be transmitted, based on the analyzed operation information when a certain operator rings the bell.

Further, the information transmission system may have an input apparatus such as a key board for inputting person information such as a possessor of a bell to whom information is to be transmitted.

Thereby the other party side is able to receive information. In this case, for example, when the doorbell is rung by a visitor, the transmitter can transmit the operator information to a counter (portable terminal or counter bell). Alternatively, for example, when the parent bell is rung by an operator who visits the parent, the transmitter can transmit the operator information to the child (child's portable terminal or child's bell).

Further, the controller may have a sound analysis system using a frequency analysis or the like of a sound of a ringing bell.

Consequently, noise is filtered by the sound analysis system, and the bell is prevented from malfunction or the like.

Further, the controller may have various kinds of sensor functions.

For example, when the bell is hit by a manual actuator such as a strike member, a finger, or the like, the sound or vibration is detected by a sensor, and the sound or vibration can thereby be taken in as information of an operator.

Further, in a case where the bell is rung in a manual manner, information of an operator is detected by a camera sensor or the like and can thereby be used for sending or information transmission as photo information.

In the disclosure, the transmitter-receiver may directly communicate with a server on a cloud through the Internet or the like or may be connected and communicate with a server via a base station for a cellular phone or the like.

In terms of saving costs and easiness of connection with more bells, communication is preferably performed via an IoT gateway such as Wi-Fi, Bluetooth (Registered trademark), 920 MHz-band wireless communication, or ZigBee.

Further, a network may be constructed by using a router in addition.

Note that in a comparatively narrow area, mutual communication between IoT gateways is also possible.

Further, the transmitter-receivers may be mutually connected in either of wired and wireless manner.

Various kinds of application software can be incorporated in a potable terminal.

For example, the operation condition of one certain bell can be browsed via application software.

Further, information can be caused to flow from one certain bell to another bell by operating application software.

In the disclosure, when the information transmission system includes plural bells, mutual communication of information of operators of the bells is performed among bells of family members or acquaintances or the like.

An information transmission system using a bell according to the disclosure can transmit the information via the bell and is thus easily operated compared to a system in related art that requires a personal computer operation.

As information transmission using the bell, various situations can be assumed.

For example, in a case where the bell is used as a call bell or a doorbell of a hotel, it is possible to send information such as the message of the person who is ringing the bell.

A configuration example of an information transmission system using a bell according to the disclosure will hereinafter be described based on drawings.

Figure 1B:
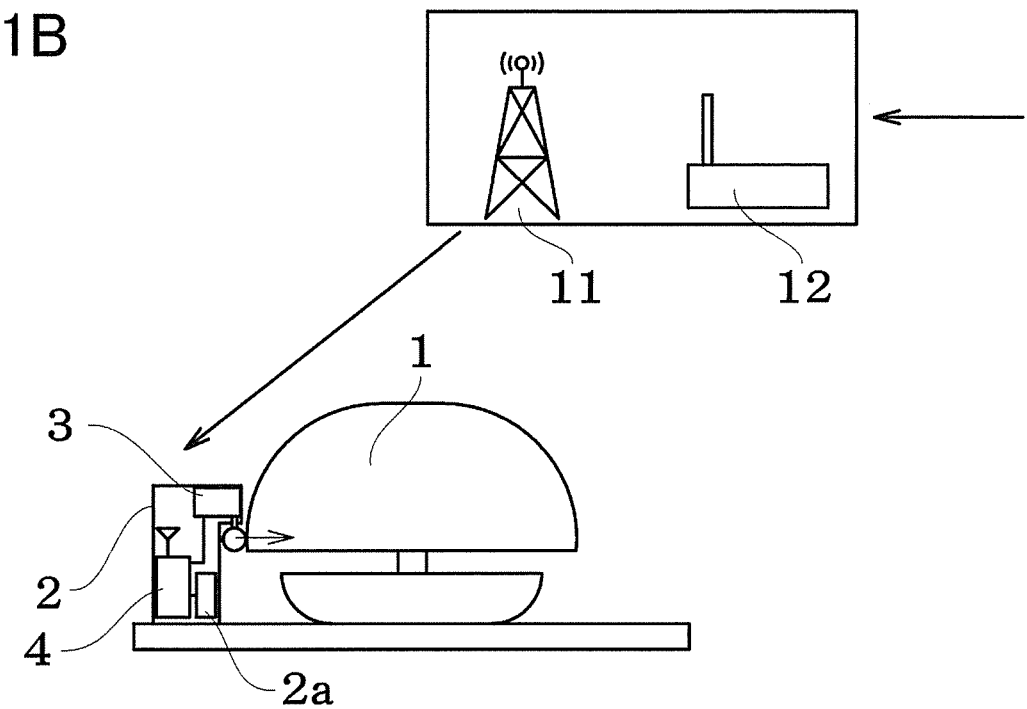

FIG. 1A and FIG. 1B illustrate an example of information transmission between a bell illustrated in FIG. 1A and a bell illustrated in FIG. 1B and illustrate an example where two bells are connected by a network, however, the number of bells is not limited, and many bells can be connected via a network.

Figure 2:
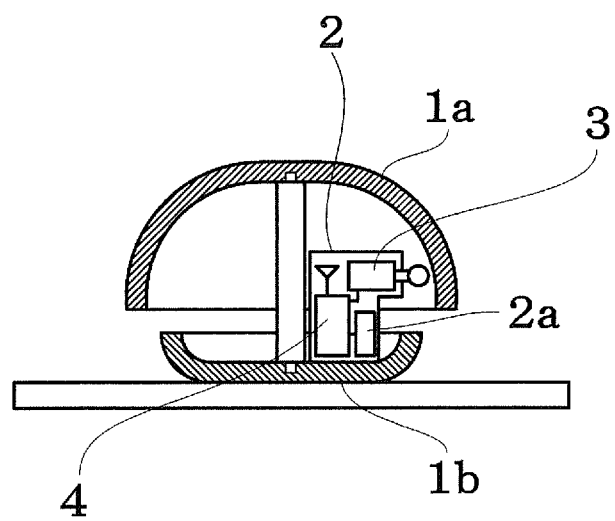
FIG. 2 illustrates an example where a controller is disposed on the inside of the bell.

A controller 2 may be disposed on the outside the bell as illustrated in FIG. 1A and FIG. 1B or may be disposed on the inside of the bell as illustrated in FIG. 2.

Further, the controller 2 may have various kinds of sensors 2a.

For example, a sensor for detecting sound or vibration in a case where the bell is manually rung, a camera sensor for detecting photo information of a person operating the bell, and so forth may be included.

This bell apparatus has a bell body portion 1a on a base portion 1b. An electronic actuator such as an electronic vibrator 3 electrically ringing the bell and a transmitter-receiver 4 for a base station 11 or a gateway 12 are provided. Note that a manual actuator is not shown in FIG. 3.

Figure 3A:
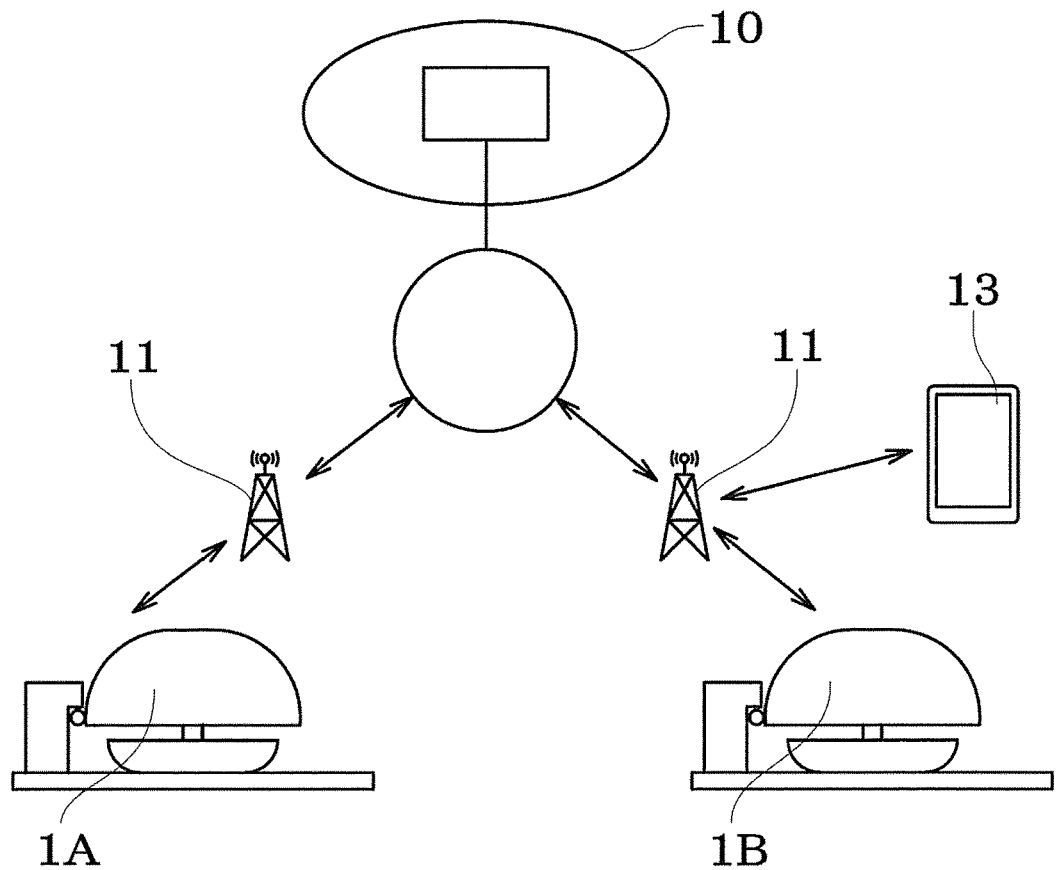
FIG. 3A illustrates an example where a network is formed via base stations.
Figure 4:
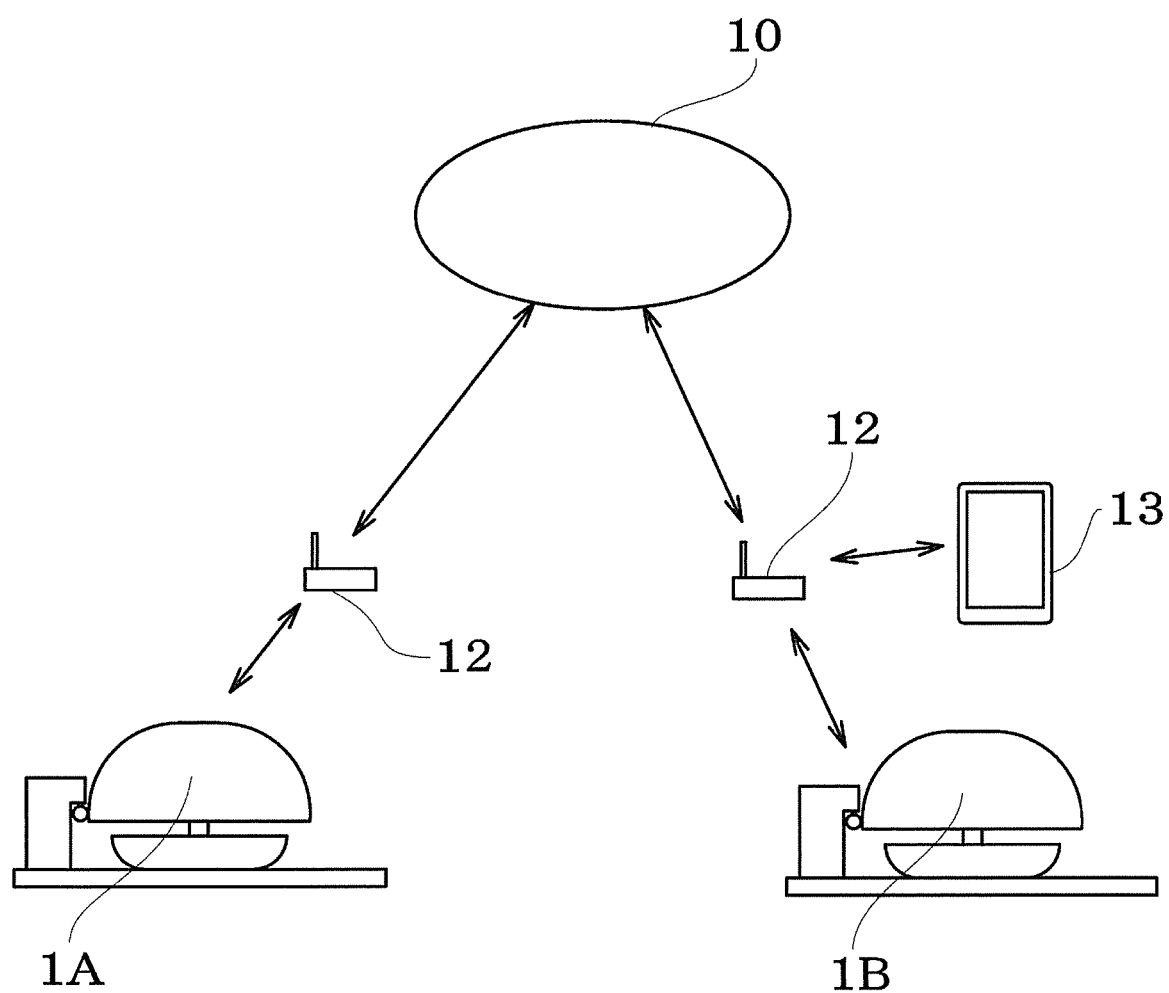
FIG. 4 illustrates an example where a network with plural bells is formed via the IoT gateways.

As a construction method of a network, a network may be formed with a server or a communication network 10 on a cloud via the base station 11 as illustrated in FIG. 3A, and a network may be constructed via the gateways 12 of various kinds of wireless systems as illustrated in FIG. 4.

Figure 3B:
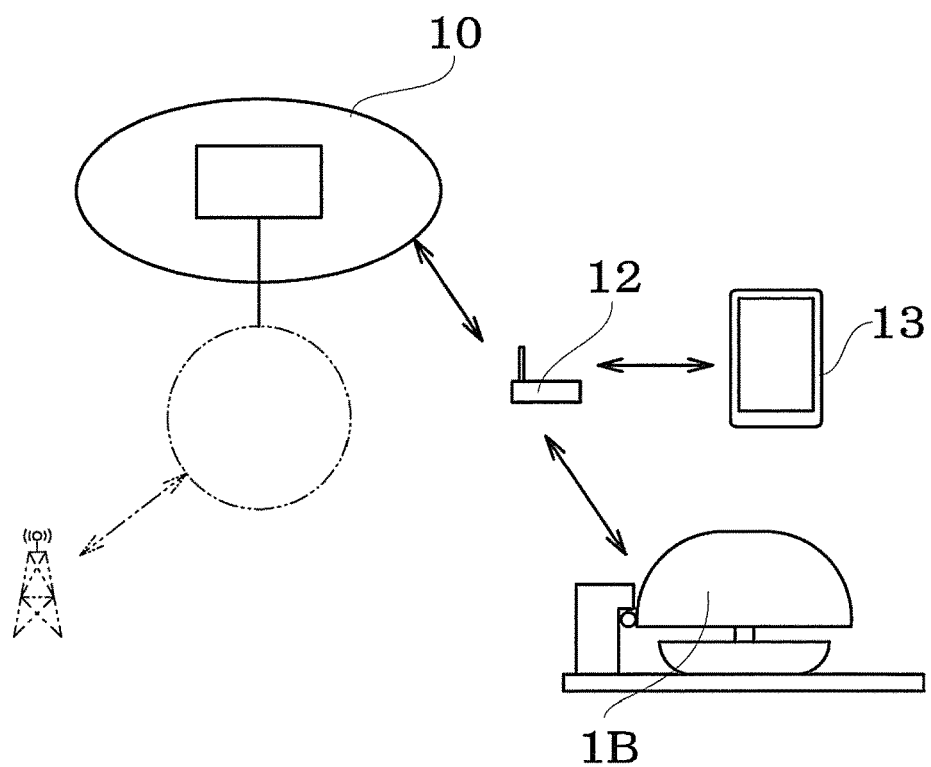
FIG. 3B illustrates an example where a network is formed via an IoT gateway.

FIG. 3B illustrates an example of a combination of FIG. 3A and FIG. 4.

Although not illustrated, the controller 2 has a computation unit that analyzes operation information of an operator in a case where the operator manually strikes and rings the bell by a manual actuator such as a strike member or a strike operation button and a memory that records various pieces of information including the information analyzed by the computation unit.

This memory records various characteristics of ways of ringing the bell by senior parents and their family members, for example.

Further, the memory may include information for an operator having ID information such as names and ages and/or photo information and person information to whom information is to be transmitted by the transmitter-receiver together with the ways of ringing the bell.

The controller 2 may have a determination unit that analyzes the way of manually ringing the bell by the computation unit when a certain operator rings a bell 1 and determines who corresponds to the certain operator among persons recorded in the memory based on the analysis.

Here, in a case where the operator is determined, when a parent rings the bell, for example, the transmitter-receiver 4 performs actuation so as to ring another bell of a person to whom the information is to be transmitted such as a child of the parent, or the operation information is sent to a communication terminal 13 possessed by a child through a communication system illustrated in FIG. 3A and FIG. 3B. The storage unit records the various person to whom the information is to be transmitted or the operation information is sent together with the corresponding characteristics of ways of ringing the bell.

Further, in a case where the bell is used as a doorbell or the like, a visitor operating the bell may be determined, and the information may be displayed on a display panel in a room, or a bell in a room may be caused to ring.

In the disclosure, when one bell 1A is rung as illustrated in FIG. 3A, another bell 1B rings based on a determination about an operator of the bell 1A via a communication network as illustrated in FIG. 1B.

Further, when the bell 1B is conversely rung, the bell 1A rings, and mutual communication is possible via bells.

The network is connected with the communication terminal (portable terminal) 13 such as a smartphone or a tablet, for example.

Accordingly, an operation condition of the bell 1A can be known via application software, and an operation for ringing the bell 1B is also possible.

Figure 5A:
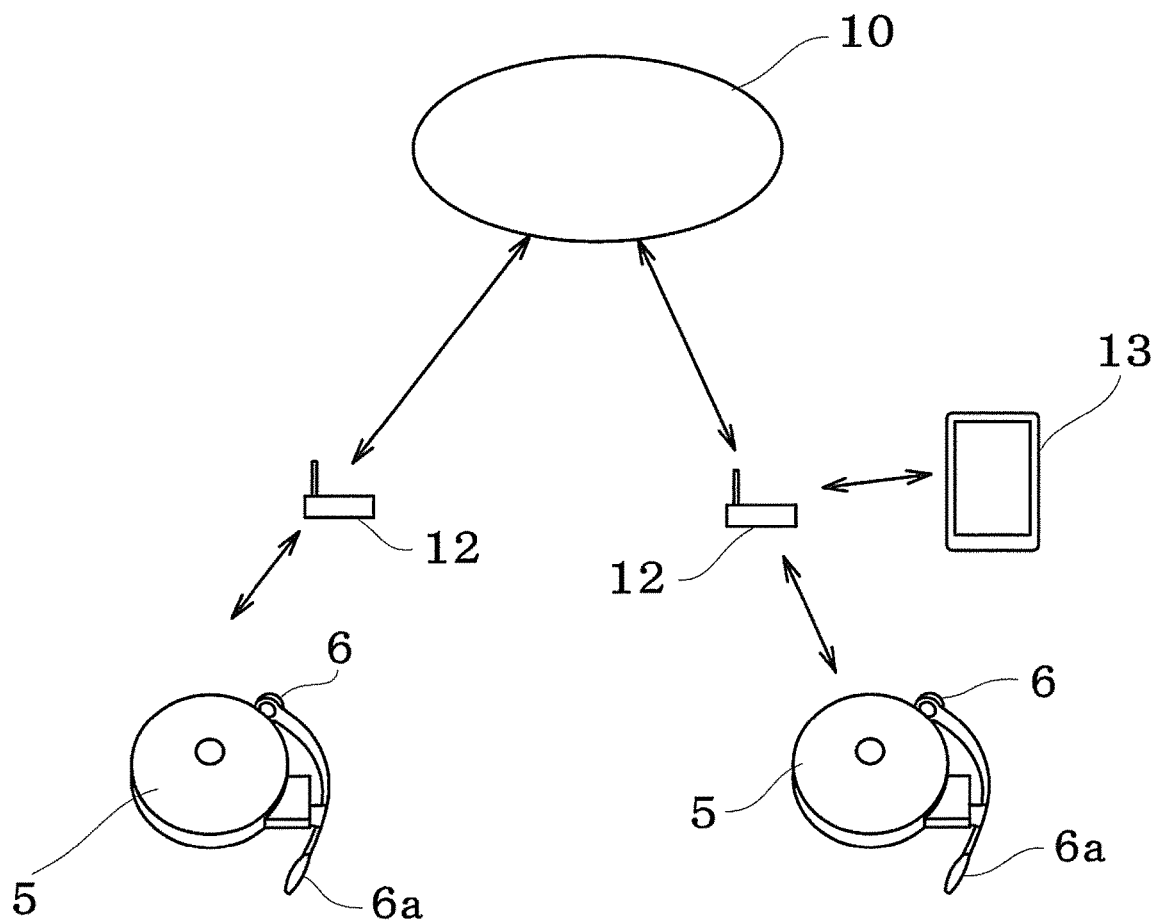
FIG. 5A illustrates an example where a call bell is used.
Figure 5B:
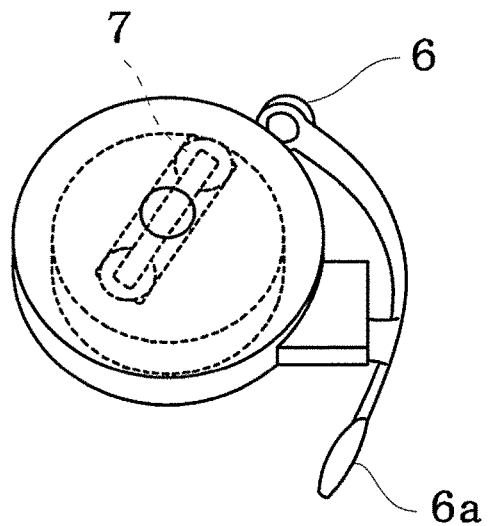
FIG. 5B illustrates a structure example of the call bell.

As illustrated in FIG. 5, the bell is capable of being mounted on a moving body such as a bicycle, for example, like a call bell 5.

The call bell 5 has a manual actuator in which a pressing operation of an operation unit 6a is performed by a finger and the bell rings by restoration of a strike unit 6 when the finger is removed and an electronic actuator such as a strike apparatus 7 on the inside such that a remote operation can be performed from the outside.

Accordingly, information transmission is possible while a moving body is moving, and a location of the moving body can also be known.

The disclosure uses a bell for an IoT device and can construct a system for performing various kinds of information transmission by an operation of the bell.

What is claimed is:

1. An information transmission system using a bell, comprising first and second bell devices that are mutually connected to a communication network, each of the first and the second bell devices integrally including:
  a bell;
  a transmitter-receiver;
  a manual actuator that is manually operated by an operator and actuates the bell;
  a sensor that detects sound or vibration of the bell;
  a controller that analyzes characteristics of ways of ringing the bell by the operator based on an output from the sensor;
  a memory that stores operation information including analyzed information obtained from the manual actuator and analyzed by the controller and ID information corresponding to the analyzed information;
  an input apparatus that inputs person information to whom information is to be transmitted by the transmitter-receiver, and
  wherein the controller determines the ID information corresponding to a certain operator among the ID information recorded in the memory when the certain operator rings the bell, based on the analyzed information analyzed by the controller, and
  wherein the transmitter-receiver of one of the first and second bell devices outputs the ID information determined by the controller to the transmitter-receiver of the other of the first and second bell devices, and
  wherein in response to the transmitter-receiver of the one of the first and second bell devices outputting the ID information to the transmitter-receiver of the other of the first and second bell devices, the electronic vibrator of the other of the first and second bell devices rings the bell located at the other of the first and second bell devices.

2. The information transmission system according to claim 1, wherein:
  the sensor has an associated camera that takes a photo of the operator; and
  the memory stores photo information of the operator of the bell.

3. The information transmission system according to claim 1, wherein the controller detects person information to whom information is to be transmitted by the transmitter-receiver based on the analyzed information when the operator rings the bell.

4. The information transmission system according to claim 1, wherein the transmitter-receiver sends the ID information to a portable terminal based on the person information.

5. An information transmission system using a bell, comprising a first bell device and a second bell device mutually connected to a communication network,
  the first bell device being located at a first location, the first bell device having a first bell, a first transmitter-receiver connected to the communication network, a first actuator that is manually operable by a first operator and which actuates the first bell, and a first sensor that detects sound or vibration of the first bell in response to actuation of the first bell, the first bell, wherein the first transmitter-receiver, the first actuator and the first sensor are located at the first location, and
  the second bell device being located at a second location remote from the first location, the second bell device having a second bell, a second transmitter-receiver connected to the communication network, a second actuator wherein the second actuator is electronically operable to actuate the second bell, and a second sensor that detects sound or vibration of the second bell in response to actuation of the second bell, wherein the second bell, the second transmitter-receiver, the second actuator and the second sensor are located at the second location,
  wherein the information transmission system further comprises:
    a controller that analyzes characteristics of ways of ringing of the first bell by an operator based on an output from the first sensor and outputs analyzed information associated with the operator;
    a memory that stores operation information including the analyzed information associated with the operator along with ID information of the operator corresponding to the analyzed information of the operator,
    wherein in response to an operator manually operating the first bell, the controller determines whether the analyzed information associated with the operator corresponds to the analyzed information stored in the memory and sends an activation signal to the second transmitter-receiver to actuate the second bell when the analyzed information corresponds to that of the certain operator,
    wherein in response to the activation signal, the second actuator electronically actuates the second bell at the second location.

6. The information transmission system according to claim 5, wherein:
  the first sensor has an associated camera that takes a photo of the operator; and
  the memory stores the photo of the operator in response to actuation of the first bell.

7. The information transmission system according to claim 5, wherein the controller detects personal information of the operator whose information is to be transmitted by the first transmitter-receiver based on the analyzed information when the operator actuates the first bell.

8. The information transmission system according to claim 5, wherein the first transmitter-receiver sends the ID information associated with the certain operator to a portable terminal in response to a match of the analyzed information with the analyzed information of the certain operator stored in the memory.

9. The information transmission system according to claim 5, wherein the first bell device has an electronic actuator at the first location and wherein the second bell device has a manual actuator for the second bell at the second location, wherein in response to a further operator operating the second bell using the manual actuator of the second bell, the controller determines whether the analyzed information associated with the further operator corresponds to the analyzed information stored in the memory and sends a further activation signal to the first transmitter-receiver to actuate the first bell when the analyzed information corresponds to that of the certain operator, and wherein in response to the further activation signal, the electronic actuator at the first bell device electronically actuates the first bell at the first location.

10. The information transmission system according to claim 5, wherein the memory comprises a first memory located at the first bell device and a second memory located at the second bell device, and wherein the controller comprises a first controller located at the first location and connected to the first transmitter-receiver and a second controller located at the second location and connected to the second transmitter receiver.

11. The information transmission system according to claim 5, wherein the first transmitter-receiver outputs the ID information of the certain operator as determined by the controller in response to a match of the analyzed information of the certain operator to the second transmitter-receiver.

12. The information transmission system according to claim 5, wherein at the first location there is an input apparatus where information associated with the certain operator may be inputted.

\* \* \* \* \*